June 15, 1926.
F. C. MOCK
1,588,488
INTAKE MANIFOLD
Filed March 3, 1920      2 Sheets-Sheet 1
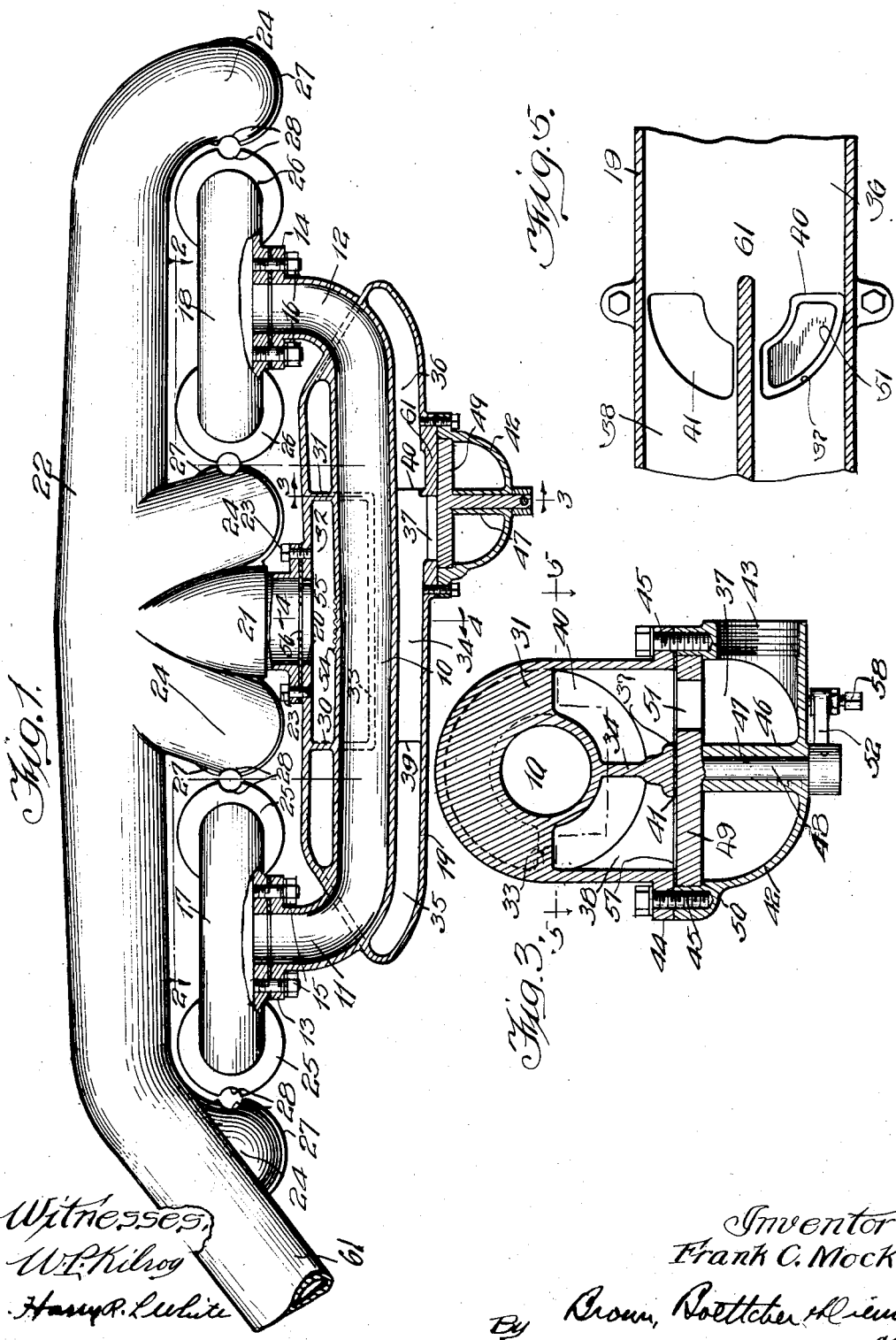
Witnesses
W. T. Kilroy
Harry R. White
Inventor:
Frank C. Mock
By Brown, Boettcher & Diener
Attys.

June 15, 1926.
F. C. MOCK
INTAKE MANIFOLD
Filed March 3, 1920    2 Sheets-Sheet 2
1,588,488
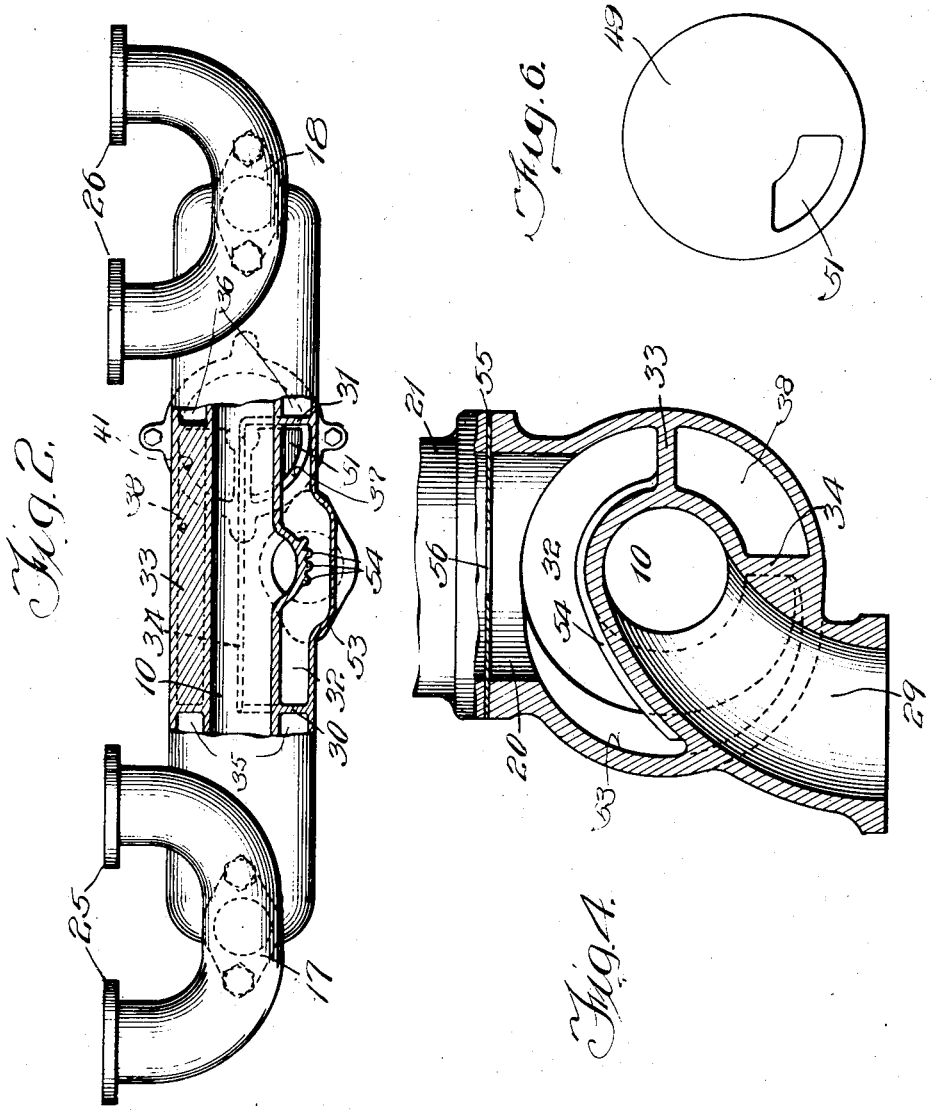
Witnesses:
W. F. Kilroy
Harry R. L. White
Inventor:
Frank C. Mock
By Brown, Boettcher & Dienner
Attys.

Patented June 15, 1926.

1,588,488

UNITED STATES PATENT OFFICE.

FRANK C. MOCK, OF CHICAGO, ILLINOIS, ASSIGNOR TO STROMBERG MOTOR DEVICES COMPANY, OF CHICAGO, ILLINOIS, A CORPORATION OF ILLINOIS.

INTAKE MANIFOLD.

Application filed March 3, 1920. Serial No. 362,935.

This invention relates to intake manifolds for internal combustion engines and contemplates primarily improvements in heating of the same by means of the exhaust gases from the engine.

It has been found that in warm weather the temperature under the hood of an internal combustion engine will increase to an abnormal extent, in some cases as high as 150 degrees F., and in extremely cold weather dropping as low as zero. Therefore, while a constant heating of the intake manifold by means of the exhaust, as has heretofore been the practice, will be useful in low atmospheric temperatures, such heating will, under high atmospheric temperatures, cause over-heating of the mixture and a consequent overheating of the cylinders of the engine. This also applies in the case of hydrocarbons of high and low boiling points, and as the quality of fuel obtainable under present conditions for internal combustion engines varies to a large degree, the regulation of the heat applied to the intake manifold as embodied in my invention is particularly desirable. The difficulties of temperature regulation are particularly of importance in connection with high power engines, such as those used on tractors and the like, where in different parts of the country the grades of fuel vary, and where climatic conditions impose a continuous strain on engine parts due to either poor fuel or undue preheating of the mixture and consequent overheating of the engine.

It is therefore the primary aim of the present invention to overcome the objectional features outlined above by providing simple and economic means for regulating the temperature of the intake manifold by regulating the area of the intake manifold heated and the period of heat application thereto. By thus regulating the temperature of the intake manifold poor quality fuel and varying atmospheric conditions may be readily allowed for.

Broadly my invention regulates the temperature of the intake manifold by retaining the exhaust heat in contact therewith for different lengths of time, and over different areas of the intake manifold. Thus, the desired range in temperature is obtained for the intake manifold without materially hindering the free passage of the exhaust gases to atmosphere. I distinguish my invention from those devices wherein the temperature of the intake manifold is controlled by permitting more or less of the exhaust gases to contact therewith. All of the exhaust gases pass continuously in contact with a portion of my improved manifold, and as set forth hereinbefore the temperature is regulated by the time element and area of manifold subjected to heat. Of course, as I will point out later the amount of exhaust gases reaching the intake manifold may be regulated or entirely cut off as well in conjunction with my improvement.

While my invention is illustrated and described as essentially a manifold structure, I lay particular stress on the new method of regulation embodied therein, and reserve the right to make such modifications in that structure as may become necessary when producing the device for the market.

Other objects and advantages to be derived from my improved manifold will appear from the following detailed description and the appended claims, taken in connection with the accompanying drawings, in which:—

Figure 1 is a side elevation, partly in section, of the manifold;

Figure 2 is a sectional view on the line 2—2 of Figure 1;

Figure 3 is a vertical sectional view on the line 3—3 of Figure 1;

Figure 4 is a similar view on the line 4—4 of Figure 1;

Fig. 5 is a horizontal sectional view taken on the plane of the line 5—5 of Fig. 3; and Fig. 6 is a plan view of the valve removed.

A preferred embodiment of my invention is illustrated in the figures of the drawings, and consists of the intake manifold comprising a straight conduit section 10, having upturned ends 11 and 12 provided with flanges 13 and 14, respectively for connection by means of bolts 15 and 16 to the distributing manifold sections 17 and 18, the latter being connected to the valve chambers of an internal combustion engine (not shown). A jacket 19 is preferably cast integrally with the intake manifold and extends throughout the length thereof and partly around the upturned ends, the jacket 19 being spaced from the intake manifold to form a chamber partitioned as hereinafter described.

The jacket 19 is provided with an opening 20, substantially midway its length for communication with the outlet port 21 of the exhaust manifold 22, bolts 23 joining the connection between said exhaust manifold and said jacket. The exhaust manifold is provided with curved extensions 24 for connection to the exhaust chambers of the internal combustion engine. The sections 17 and 18 and said extensions 24 are provided with flanges 25 and 26, and flanges 27 respectively, said flanges all being in the same plane and the adjacent edges thereof being provided with coinciding curved notches 28 to receive the shanks of common connecting bolts (not shown). The structure described in the foregoing is largely conventional and may be varied to meet conditions developing with different types of internal combustion engines, and in internal combustion engines wherein a greater or lesser number of cylinders are employed than shown.

The intake manifold is provided with a curved entrance throat 29, extending through the jacket 19 and downwardly for connection to the outlet of a carburetor or other fuel vaporizing device.

A pair of transverse partitions 30 and 31 extend between the jacket 19 and the wall of the intake manifold and are arranged to form a chamber 32 intermediate the length of the intake manifold and in communication with the exhaust outlet port 21. The chamber 32 extends but part way (preferably three-quarters) around the intake manifold, terminating at the longitudinal partitions 33 and 34. The partitions 30 and 31 form end chambers 35 and 36 which are mutually connected to the outlet port 37 by a passageway 38. This passageway is defined in the 90 degree area defined between the longitudinal partitions 33 and 34. The central-chamber 32 communicates with the end chambers through ports 39 and 40. The location of these ports is illustrated in Figures 1 and 3. The passageway 38 extending between the end chambers 35 and 36 communicates with an outlet port 41 contiguous to the port 37 hereinbefore referred to.

I provide a valve, the function of which is to control the ports 37 and 41 and to thereby distribute the exhaust gases to the end chambers 35 and 36, or to direct the outward discharge of the gases after passing through the central chamber 32 only. This valve comprises preferably a semi-spherical housing 42 having an outlet port 43 to which an exhaust muffler may be connected. The housing is secured to a flange 44 formed on the jacket 19 by bolts 45. This housing is provided with an axial stud 46 having a bore 47 affording a bearing for the shaft 48 of the disk valve 49. The marginal edges of the valve are receivable between a portion of the flange 44 and an annular shoulder 50 formed on the inner edge of the housing. The disk 49 is provided with an aperture 51, preferably a little less in size than the ports 37 and 41 and by rotation of the disk this opening is adapted to register with one or the other of said ports. The valve shaft 48 projects beyond the housing wall and has mounted thereon a lever, which may be connected to suitable operating means convenient to the driver.

As best shown in Figures 2 and 4 the jacket 19 is provided with an enlarged portion 53 in order to maintain continuity of the chamber 32. The portion of the entrance throat of the intake manifold which is exposed within the chamber 32 is provided with a plurality of parallel ribs 54 tending to enhance the heating effect of the exhaust gases passing thereover.

In Figure 1 I have illustrated in connection with the ports 20 and 21 a disk 55 provided with an opening 56 for restricting the passage of exhaust gas. This may be omitted when the manifold is used in extremely cold weather. A gasket 57 is placed between the inner space of the disk valve 49 and the flange 44 to prevent leakage.

In some cases it may be desired to lock the valve in one or the other of the controlling positions, and therefore, I have provided a bolt 58 in the free end of the lever 52 for locking the lever.

In operation, and with the valve 49 in the position shown in Figure 3, the exhaust gases enter the chamber 32 and pass around the intake manifold, and then down through the port 37 and the aperture 51 to the outlet port 43. In this manner the central chamber 32 only is heated and practically no heat from the exhaust gases is communicated to the end chambers 35 and 36. However, when it is desired to circulate the gases through the end chambers 35 and 36 as well as through the chamber 32, the valve 49 is rotated until the aperture 51 therein registers with the port 41. In this manner, the exhaust gases, instead of passing directly out of the jacket 19 are diverted through the ports 39 and 40 into the end chambers 35 and 36, after passing through the central chamber 32. The gases circulate out to the ends of these chambers and then double back and enter the passageway 38, discharging therefrom down through the outlet 41, through the aperture 51, and thence out through the outlet port 43. It will be apparent that the valve 49 simultaneously closes one path of exit as another path is opened.

The exhaust gases may be excluded entirely from the jacket by placing the valve 49 in the neutral position, that is, with the valve opening 51 under the solid portion 61 of the floor of the jacket 19. In this manner the escape of gases through the valve and through the jacket is prevented, and therefore all of the gases may pass out through one end or the other of the exhaust manifold. To provide for this, one end of the exhaust manifold may be permanently connected to an outlet pipe communicating with the exhaust muffler, this outlet pipe being designated 61 in Fig. 1, and the exhaust gases permitted to pass around the intake manifold only at such times as heating of the same may be required to a greater or less degree.

It will be seen that the period of time which the intake manifold is subjected to the influence of the exhaust gases and the area affected thereby are readily varied to suit different conditions of fuel quality and atmospheric temperature. By the provision of the fixed calibrating disk 55 and the variable means represented by the valve 49 the user of the engine is enabled to regulate to a nicety the ultimate temperature of the gas reaching the cylinders.

I do not intend to limit my invention to the details shown, but reserve the right to make such changes therein as do not depart from the spirit and scope of the invention as claimed.

I claim:—

1. In combination, fuel feeding apparatus for an internal combustion engine comprising a first conduit, a second conduit enveloping a portion of said first conduit and defining a chamber therebetween, a partition in said chamber, an intake port opening into said chamber, an outlet port leading from said chamber, and valve means operable to cause the fluid flowing through said chamber to be confined substantially on one side of said partition or to flow around said partition.

2. In combination, an intake manifold separate from the engine block, a jacket enclosing a portion of said manifold and defining a heating chamber, exhaust inlet means to such a chamber, exhaust outlet means from said chamber, and selective valve mechanism cooperating with said baffle whereby in one position of said valve mechanism the exhaust gases heat an intermediate portion of said manifold and in another position of said valve mechanism the exhaust gases are caused to flow toward the ends of said manifold around said baffle for heating said ends.

3. In combination, an intake manifold, an exhaust manifold, a heating jacket associated with said intake manifold, an inlet port to said jacket, an outlet port from said exhaust manifold, said inlet port being adapted to be detachably coupled to said outlet port, and a gasket-like restricting member interposed between said ports in the operation of connecting said ports together, said restricting member having a restricting orifice for limiting the flow of exhaust gases through said jacket, and being readily interchangeable for substituting other gaskets having different sized restricting openings.

4. In combination, an exhaust manifold, an intake manifold having a jacket in communication with said exhaust manifold and means for applying the heat of exhaust gases to the central portion or central and end portions of said intake manifold.

5. In combination, an exhaust manifold, an intake manifold having a jacket forming central and end compartments surrounding said intake manifold, the central compartment being in communication with said exhaust manifold and means for applying the heat of the exhaust to said central compartment or to the end compartment and central compartment.

6. In combination, an intake manifold, an exhaust manifold, a jacket surrounding the intake manifold and having a plurality of chambers communicating with the exhaust manifold, a pair of discharge ports formed in said jacket, and a valve rotatable to selectively cover either one of said discharge ports.

7. In combination, an intake manifold, an exhaust manifold, a jacket surrounding the intake manifold and having a central chamber in communication with the exhaust manifold, end chambers in communication with the central chamber, a discharge port in communication with the central chamber, a second discharge port communicating with the end chambers, and a valve for controlling said ports alternately.

8. In combination, an exhaust manifold, an intake manifold having a jacket formed with a central compartment in communication with the exhaust manifold, end compartments formed in said jacket, said end compartments being in communication with the central compartment, exit ports for said central and end compartments, and a valve for closing one or the other of said ports for directing the exhaust gases through the central compartment or through both the end and central compartments, and for closing both of said ports for excluding the exhaust gases from said jacket.

In witness whereof, I hereunto subscribe my name this 24th day of February, A. D. 1920.

FRANK C. MOCK.